(12) United States Patent
Ochiai (10) Patent No.: US 11,486,323 B2
(45) Date of Patent: Nov. 1, 2022

(54) ENGINE CONTROL DEVICE

(71) Applicant: HONDA MOTOR CO., LTD., Tokyo (JP)

(72) Inventor: Shinobu Ochiai, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/174,417

(22) Filed: Feb. 12, 2021

(65) Prior Publication Data

US 2021/0262409 A1    Aug. 26, 2021

(30) Foreign Application Priority Data

Feb. 25, 2020    (JP) .............................. JP2020-029683

(51) Int. Cl.
*F02D 41/02*    (2006.01)
*F02D 41/22*    (2006.01)
(Continued)

(52) U.S. Cl.
CPC ....... *F02D 41/0255* (2013.01); *F02D 31/001* (2013.01); *F02D 41/0097* (2013.01); *F02D 41/22* (2013.01); *F02D 2200/101* (2013.01)

(58) Field of Classification Search
CPC .... F02D 41/02; F02D 41/0255; F02D 31/001; F02D 41/0097; F02D 41/22; F02D 2200/101; F02D 2009/022; F02D 2009/0235; F02D 1/001; F02D 1/006; F02D 1/007; F02D 1/009; F02D 2041/227; F02D 41/002; F02D 41/005; F02D 41/007; F02D 41/062; F02D 41/064; F02D 41/065; F02D 41/068; F02D 41/08; F02D 41/083;
(Continued)

(56) References Cited

U.S. PATENT DOCUMENTS 4,597,047 A * 6/1986 Deutsch ................ F02D 41/045
123/585
4,660,519 A * 4/1987 Stocker ................. F02D 31/005
123/493
(Continued)

FOREIGN PATENT DOCUMENTS

CN    111305963 A * 6/2020 .............. F02D 11/10
CN    111305963 B * 8/2021 .............. F02D 11/10
(Continued)

OTHER PUBLICATIONS

Japanese Office Action for Japanese Patent Application No. 2020-029683 dated Nov. 26, 2021 (partially translated).

*Primary Examiner* — Kevin R Steckbauer
(74) *Attorney, Agent, or Firm* — Thomas|Horstemeyer, LLP (57) ABSTRACT

There is provided with an engine control device that can reduce the time it takes to start the monitoring of an output of an engine. The engine control device comprises a monitor unit configured to monitor an output of an engine when engine speed is a threshold or more, and a control unit configured to control the engine based on a result of the monitor unit, wherein the monitor unit includes an output determination unit that determines whether the output of the engine is excessive, and a change unit that changes in accordance with a warm-up state of the engine, the threshold.

6 Claims, 6 Drawing Sheets

(51) Int. Cl.
*F02D 31/00* (2006.01)
*F02D 41/00* (2006.01)

(58) Field of Classification Search
CPC ........ F02D 41/086; F02D 41/12; F02D 41/16; F02D 2700/023; F02D 2700/0233; F02D 2700/0241; F02D 2700/0248; F02D 2700/0251; F02P 5/1504; F02P 5/1506; F02P 5/1508
See application file for complete search history.

(56) References Cited

U.S. PATENT DOCUMENTS

| | | | | |
|---|---|---|---|---|
| 5,163,398 A * | 11/1992 | Buslepp | | F02D 43/00 123/339.21 |
| 5,694,897 A * | 12/1997 | Kaji | | F01P 11/14 123/339.15 |
| 5,784,878 A * | 7/1998 | Kato | | F01N 3/2013 60/285 |
| 6,006,724 A * | 12/1999 | Takahashi | | F02D 41/0002 123/480 |
| 6,152,105 A * | 11/2000 | Nishimura | | F02P 5/1508 123/436 |
| 6,176,218 B1 * | 1/2001 | Beechie | | F02D 31/008 123/339.22 |
| 6,704,639 B2 * | 3/2004 | Amano | | F02D 41/18 123/507 |
| 6,742,498 B2 * | 6/2004 | Mabuchi | | F02D 41/0225 123/339.18 |
| 6,814,688 B2 * | 11/2004 | Foelsche | | F16H 59/18 701/61 |
| 6,886,530 B2 * | 5/2005 | Matischok | | F02D 41/1497 123/319 |
| 6,938,598 B1 * | 9/2005 | Lewis | | F02D 41/0002 123/179.3 |
| 7,028,650 B2 * | 4/2006 | Lewis | | F02D 41/12 123/90.11 |
| 7,032,545 B2 * | 4/2006 | Lewis | | F01L 1/36 123/90.11 |
| 7,055,483 B2 * | 6/2006 | Lewis | | F02D 41/0087 123/179.18 |
| 7,140,355 B2 * | 11/2006 | Michelini | | F02D 41/008 123/192.1 |
| 7,555,896 B2 * | 7/2009 | Lewis | | F01L 9/20 123/481 |
| 8,234,049 B2 * | 7/2012 | Stempnik | | F02D 41/023 123/376 |
| 8,234,054 B2 * | 7/2012 | Nakasaka | | F02D 13/0238 123/316 |
| 8,560,185 B2 * | 10/2013 | Narazaki | | F02D 29/00 701/50 |
| 9,126,578 B2 * | 9/2015 | Ott | | B60W 10/10 |
| 10,428,753 B2 * | 10/2019 | Fukuda | | F02D 41/083 |
| 10,907,555 B2 * | 2/2021 | Suzuki | | F02D 37/02 |
| 10,927,777 B2 * | 2/2021 | Pedder | | F02D 19/081 |
| 11,008,961 B2 * | 5/2021 | Suzuki | | F02D 41/0002 |
| 11,118,527 B2 * | 9/2021 | Nodera | | G01M 15/044 |
| 2002/0132701 A1 * | 9/2002 | Mabuchi | | F02D 31/003 477/110 |
| 2003/0064856 A1 * | 4/2003 | Foelsche | | F16H 59/18 477/120 |
| 2003/0204302 A1 * | 10/2003 | Amano | | F02D 41/18 701/102 |
| 2004/0187841 A1 * | 9/2004 | Matischok | | F02D 41/1497 123/320 |
| 2005/0204726 A1 * | 9/2005 | Lewis | | F02D 13/06 60/285 |
| 2005/0204727 A1 * | 9/2005 | Lewis | | F01L 9/20 60/285 |
| 2005/0205020 A1 * | 9/2005 | Lewis | | F02D 13/06 123/21 |
| 2005/0205028 A1 * | 9/2005 | Lewis | | F02D 41/221 123/90.11 |
| 2005/0205036 A1 * | 9/2005 | Lewis | | F02N 19/004 123/179.3 |
| 2005/0205038 A1 * | 9/2005 | Lewis | | F02D 41/0087 123/179.18 |
| 2005/0205045 A1 * | 9/2005 | Michelini | | F02D 13/06 123/198 F |
| 2009/0234545 A1 * | 9/2009 | Stempnik | | F02D 41/023 701/54 |
| 2010/0131170 A1 * | 5/2010 | Nakasaka | | F02D 13/0269 123/48 C |
| 2011/0172933 A1 * | 7/2011 | Winkel | | F02D 41/1402 702/41 |
| 2012/0125295 A1 * | 5/2012 | Senda | | F02P 5/14 123/478 |
| 2013/0190994 A1 * | 7/2013 | Narazaki | | F02D 29/00 701/50 |
| 2014/0214289 A1 * | 7/2014 | Ott | | F16H 59/78 477/37 |
| 2016/0138494 A1 * | 5/2016 | Arikai | | B60W 50/0205 701/102 |
| 2017/0248090 A1 * | 8/2017 | Fukuda | | B60H 1/3208 |
| 2020/0003137 A1 * | 1/2020 | Pedder | | F02D 19/081 |
| 2020/0158034 A1 * | 5/2020 | Suzuki | | F02D 37/02 |
| 2020/0158036 A1 * | 5/2020 | Suzuki | | F02D 13/0261 |
| 2020/0165996 A1 * | 5/2020 | Goto | | F02D 41/22 |
| 2020/0355138 A1 * | 11/2020 | Nodera | | F02D 41/0002 |
| 2020/0386135 A1 * | 12/2020 | Kobayashi | | F02D 29/06 |
| 2021/0262409 A1 * | 8/2021 | Ochiai | | F02D 41/068 |

FOREIGN PATENT DOCUMENTS

| | | | | |
|---|---|---|---|---|
| CN | 113374591 A | * | 9/2021 | ........... F02D 31/001 |
| JP | 2002242741 A | * | 8/2002 | ........... F02D 11/107 |
| JP | 2009097347 A | | 5/2009 | |
| JP | 2011-163277 A | | 8/2011 | |
| JP | 2011163277 A | * | 8/2011 | ............. F02D 11/10 |

\* cited by examiner

ENGINE CONTROL DEVICE

CROSS-REFERENCE TO RELATED APPLICATION(S)

This application claims priority to and the benefit of Japanese Patent Application No. 2020-029683 filed on Feb. 25, 2020, the entire disclosure of which is incorporated herein by reference.

BACKGROUND OF THE INVENTION

Field of the Invention

The present invention relates to an engine control device.

Description of the Related Art

An engine control device, in order to be able to realize a request of a driver related to a vehicle, is configured to calculate a target value of an output of an engine and to control a throttle valve, the amount of intake air, ignition timing, and the like so that the output of the engine is at the target value.

Also, the engine control device, in order to prevent the output of the engine from exceeding a permitted output due to an abnormality in control calculation and the like (abnormal torque) and causing an unintended acceleration of a vehicle, comprises a monitor unit (torque monitor). A torque monitor is a system that detects an abnormal torque, performs regulation of the output of the engine and the like, and causes the engine to shift from an abnormal state to a safe state. Japanese Patent Laid-Open No. 2009-097347 discloses a technique that determines whether an engine torque is in a state in which it exceeds a target torque and deals with it appropriately.

SUMMARY OF THE INVENTION

According to one embodiment of the present invention, an engine control device comprising: a monitor unit configured to monitor an output of an engine when engine speed is a threshold or more; and a control unit configured to control the engine based on a result of the monitor unit, wherein the monitor unit includes: an output determination unit that determines whether the output of the engine is excessive, and a change unit that changes in accordance with a warm-up state of the engine, the threshold.

DESCRIPTION OF THE EMBODIMENTS

A torque monitor is configured so as to start monitoring in a case where the engine speed reaches a threshold or more, and for the threshold, in order to prevent misdetection, an engine speed that is greater than or equal to a high idle speed for before a warm-up of an engine is completed is employed. However, because idle speed decreases after a warm-up is completed, if the threshold continues to be set at the high engine speed, it would require a lot of time to start the monitoring.

An embodiment of the present invention provides an engine control device that can reduce the time it takes to start the monitoring of an output of an engine.

Hereinafter, embodiments will be described in detail with reference to the attached drawings. Note, the following embodiments are not intended to limit the scope of the claimed invention, and limitation is not made to an invention that requires a combination of all features described in the embodiments. Two or more of the multiple features described in the embodiments may be combined as appropriate. Furthermore, the same reference numerals are given to the same or similar configurations, and redundant description thereof is omitted.

Engine Control Device According to One Embodiment

An engine control unit (ECU) includes a processing unit, a storage unit such as a RAM and a ROM, and an interface unit that relays transmission/reception of signals between an external device and the processing unit. The processing unit is a processor that is typified by a CPU, executes programs stored in the storage unit, and controls driving of an engine. In the storage unit, in addition to programs that the processing unit executes, various kinds of data are stored. In the interface unit, detection results of various kinds of sensors are provided via a signal processing circuit, and the processing unit controls a fuel injection valve and an ignition apparatus of each cylinder via a driving circuit based on the provided detection results. Also, the engine control device may be applied to a hybrid system that includes an engine system.

Figure 1:
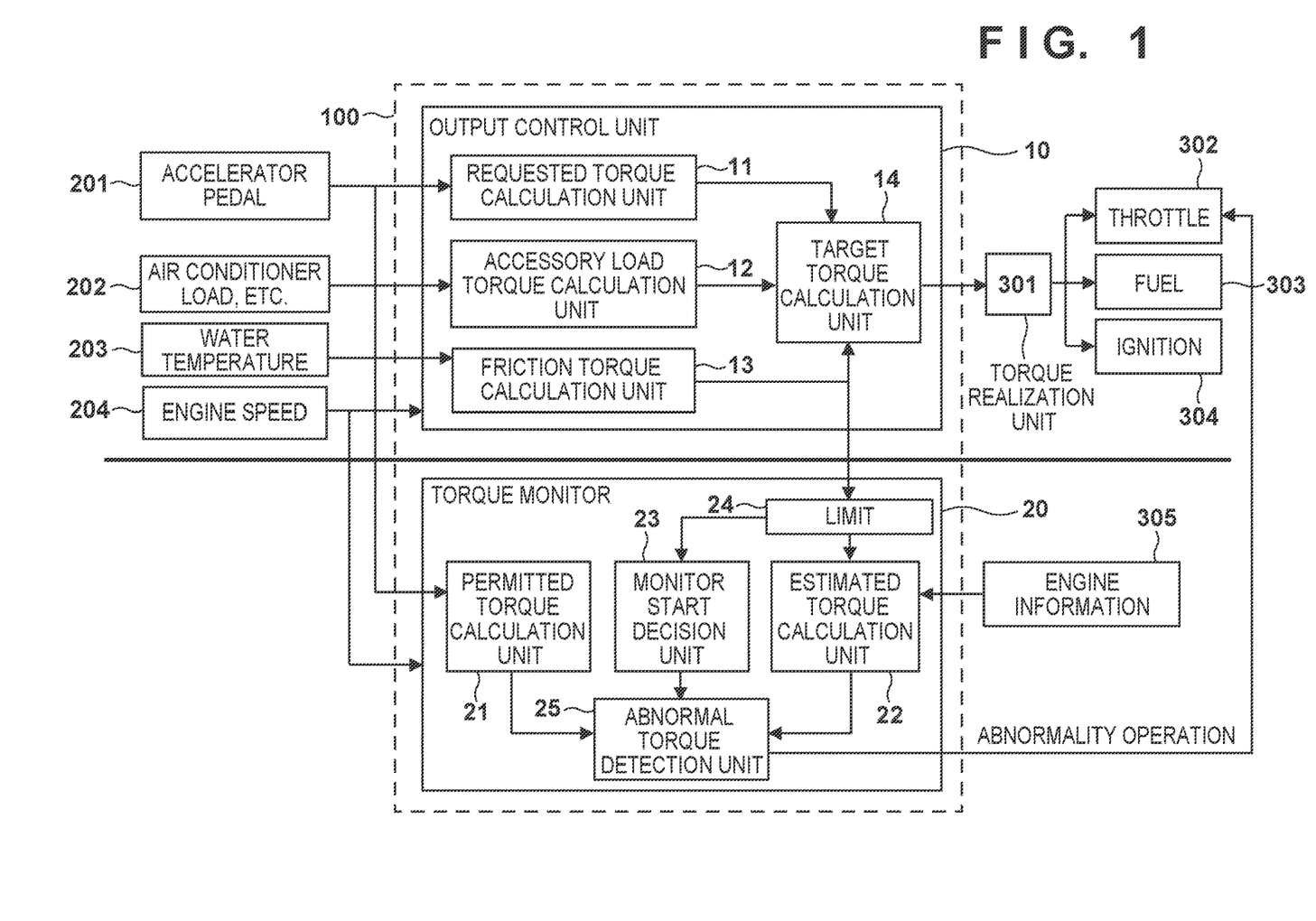
FIG. 1 is a functional block diagram illustrating a configuration of an engine control device according to an embodiment.

FIG. 1 is a functional block diagram illustrating a configuration of an engine control device according to an embodiment. An engine control device 100 is connected to sensors such as an accelerator pedal sensor 201 that detects the amount of operation of an accelerator pedal by a driver, an accessory sensor (switch) 202 that detects the amount of load on accessories (such as an air conditioner and a cooling fan), a cooling water temperature sensor 203 that detects the temperature of engine cooling water, and an engine speed sensor 204 that detects engine speed.

Also, the engine control device 100 is connected to, although not shown, a throttle valve opening sensor that detects the amount of opening of a throttle valve 302, an intake air amount sensor that detects the amount of intake air and airflow of the engine, an intake air temperature sensor that detects the temperature of intake air, an intake air pressure sensor that detects the pressure of intake air, an air fuel ratio sensor that detects an air fuel ratio, and the like.

The engine control device 100 includes an output control unit 10 that controls the engine and a torque monitor unit 20 that monitors the output of the engine. The engine control device 100, by the output control unit 10, provides a torque realization unit 301 with a target torque value of the output of the engine that was calculated based on the detection results from the sensors and the like and controls, via the torque realization unit 301, by the throttle valve 302, a fuel injection valve 303, and an ignition apparatus 304, the output to be at the target torque value. Meanwhile, the engine control device 100 detects that the output of the engine is excessive in the torque monitor unit 20 based on the detection results from the sensors and the like, and based on the result thereof, adjusts the amount of opening of the throttle valve 302, thereby controlling to reduce the output torque of the engine.

(Output Control Unit)

The output control unit 10 comprises a requested shaft torque calculation unit 11 that calculates a torque that the driver has requested, an accessory load torque calculation unit 12 that calculates a torque that accords with the amount of load of the accessories, a friction torque calculation unit 13 that calculates a friction torque of the engine, and a target torque calculation unit 14 that calculates a target value of the output torque of the engine.

The requested shaft torque calculation unit 11, based on the amount of operation of the accelerator pedal by the driver that was detected by the accelerator pedal sensor 201, the engine speed that was detected by the engine speed sensor 204, and the like, calculates a torque that the driver has requested. The accessory load torque calculation unit 12, based on the amount of load of the accessories that was detected by an accessory sensor 202, calculates a torque that accords with the amount of load of the accessories. The friction torque calculation unit 13, based on the water temperature and the like that was detected by the cooling water temperature sensor 203, calculates the friction torque of the engine.

The target torque calculation unit 14, based on the torques that were calculated in the requested shaft torque calculation unit, the accessory load torque calculation unit, and the friction torque calculation unit, calculates a target value of the output torque of the engine. A signal of the target torque value of the output torque of the engine that was calculated in the target torque calculation unit 14 is provided to the torque realization unit 301, and in addition to having the amount of opening of the throttle valve 302 and the ignition apparatus 304 controlled so that the output torque of the engine coincides with the target torque, a time for fuel injection by the fuel injection valve 303 is controlled.

(Torque Monitor Unit)

The torque monitor unit 20 comprises a permitted shaft torque calculation unit 21, an estimated shaft torque calculation unit 22, a limit 24, a monitor decision unit 23, and an abnormal torque detection unit 25 and when the engine speed is a threshold or more, monitors the output of the engine.

The permitted shaft torque calculation unit 21 comprises a control circuit that calculates a shaft torque that is permitted in the engine. For the shaft torque that is permitted in the engine, a permitted torque can be calculated by adding a predetermined torque value to a requested shaft torque value that is calculated from the above-described amount of operation of the accelerator pedal by the driver, the engine speed, and the like. The predetermined torque value to be added is the amount of torque that the engine can permit in relation to the shaft torque of the engine and is a torque value of an amount that is detected as an abnormal torque, and a value that accords to the engine and the like is set.

The estimated shaft torque calculation unit 22, based on engine information 305 such as the amount of intake air of the engine that was detected by the intake air amount sensor, the friction torque value, and ignition timing, calculates an estimated shaft torque. The estimated shaft torque can be calculated by subtracting the friction torque value from the output torque of the engine that was estimated from the amount of intake air and the ignition timing. Also, the friction torque value may be provided via the limit 24.

The monitor decision unit 23, when the engine speed that was detected by the engine speed sensor 204 is a threshold or more, provides the abnormal torque detection unit 25 with a signal to start monitoring the torque. The threshold can be set taking into account that it is something that changes depending on the presence/absence of a malfunction of the engine.

The threshold according to the embodiment of the present invention is changed in accordance with a warm-up state of the engine. By this, the timing at which to start the torque monitor for when the engine is cooling down or warming up becomes appropriate, and the time it takes to start monitoring the output of the engine can be reduced.

A warm-up state is substituted as the temperature of the engine when the engine is being driven and is a state until the temperature of cooling water that is detected by the cooling water temperature sensor 203 increases to a predetermined temperature (e.g., 90° C.). In the embodiment, a warm-up state may be separated into a cold state at an early stage of when the engine is started, a warm-up completed state in which the warm-up of the engine has been completed, and a semi warm-up state that is between the cold state and the warm-up completed state. Note that in the warm-up completed state, it is assumed that a state after the warm-up has been completed (a state in which the temperature of cooling water is for example, 90° C. or more) is also included.

The cold state in an early stage of when the engine is started is a state in which the temperature of cooling water is for example, less than 40° C. The warm-up completed state in which the warm-up of the engine has been completed is a state in which the temperature of cooling water is for example, 90° C. or more (a temperature that indicates that the warm-up of the engine has been completed). Also, the semi warm-up state of the engine is a state of for example, 40° C. or more and less than 90° C.

The monitor decision unit 23, based not only on the temperature of cooling water that is detected by the cooling water temperature sensor 203 but also the friction torque value that correlates with the temperature of the cooling water and is detected by the friction torque calculation unit 13, engine start time, and the like, can detect the warm-up state. Because the friction torque has been made into a requirement for functional safety in Automotive Safety Integrity Level (ASIL), the monitor decision unit 23, in the embodiment, detects the warm-up state based on the friction torque value.

The limit 24 acquires the friction torque value that was calculated in the friction torque calculation unit 13 and provides the estimated shaft torque calculation unit 22 with the friction torque value that is a predetermined value or less. The limit 24, in a case where the acquired friction torque value exceeds a predefined upper limit value, deems that the friction torque value that was calculated in the friction torque calculation unit 13 is abnormal and provides the estimated shaft torque calculation unit 22 with the upper limit value as a friction torque value instead of the calculated friction torque value. The friction torque value is something that is subtracted from the output torque of the engine that was estimated in the estimated shaft torque calculation unit 22, and by making the upper limit of the friction torque value thereof to be a limit, it becomes possible to prevent the abnormality in the calculation of the friction torque value from being propagated to an estimated shaft torque value.

As described above, because the monitor decision unit 23, in the embodiment, detects the warm-up state based on the friction torque value, the limit 24 also provides the monitor decision unit 23 with the friction torque value.

The abnormal torque detection unit 25, in accordance with a signal for starting monitoring that was acquired from the monitor decision unit 23, determines whether the output of the engine is excessive. The abnormal torque detection unit 25 compares a torque value that was calculated in the estimated shaft torque calculation unit 22 and a torque value that was calculated in the permitted shaft torque calculation unit 21 and when the torque value that was calculated in the estimated shaft torque calculation unit 22 is greater than or equal to the torque value that was calculated in the permitted shaft torque calculation unit 21, detects that the output of the engine is excessive.

When the abnormal torque detection unit 25 detects that the output of the engine is excessive, the engine control device 100 adjusts the amount of opening of the throttle valve 302, thereby controlling to reduce the output torque of the engine (performs abnormality operation).

Figure 2:
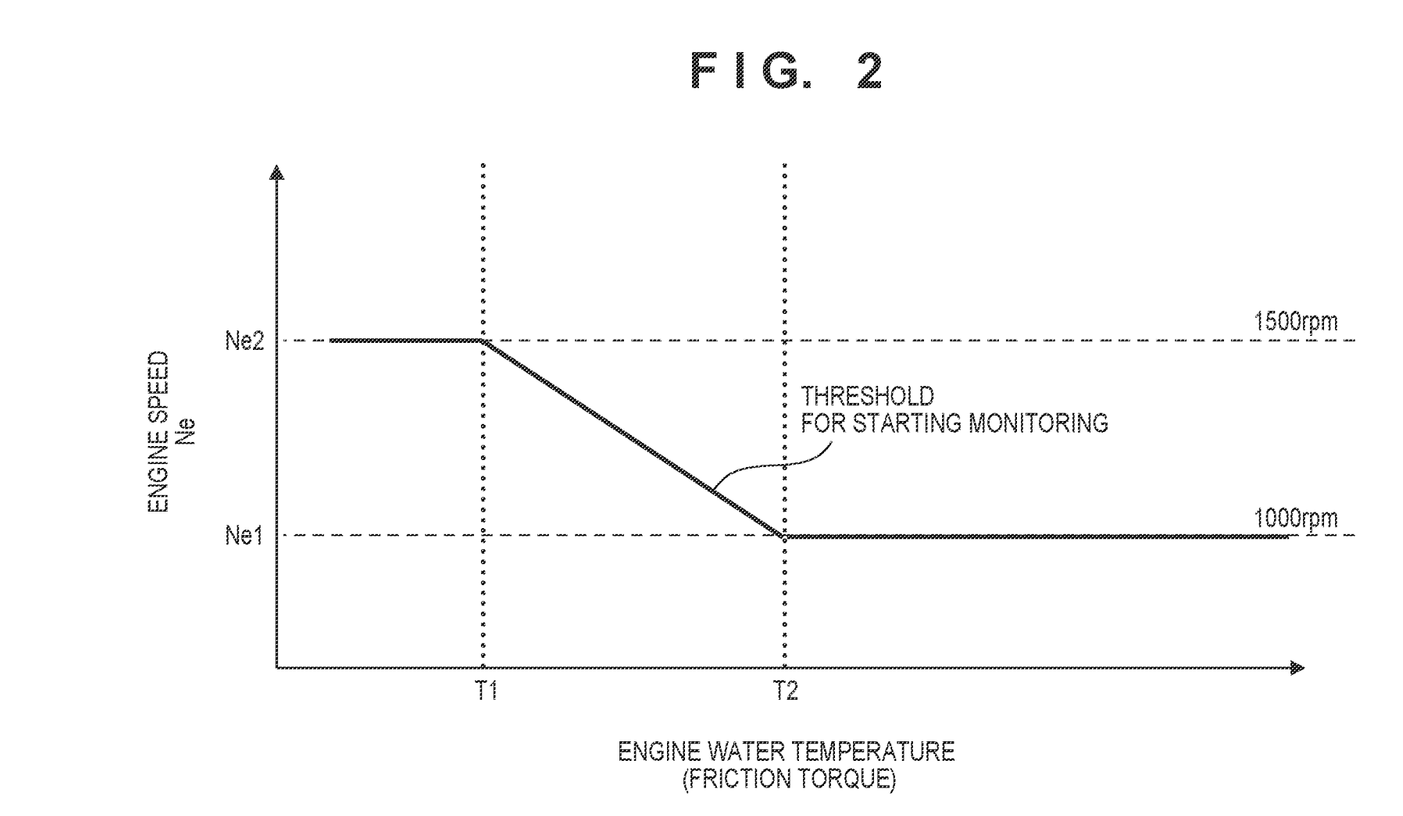
FIG. 2 is a view illustrating an example of a change in a threshold for starting monitoring according to the embodiment.
Figure 3:
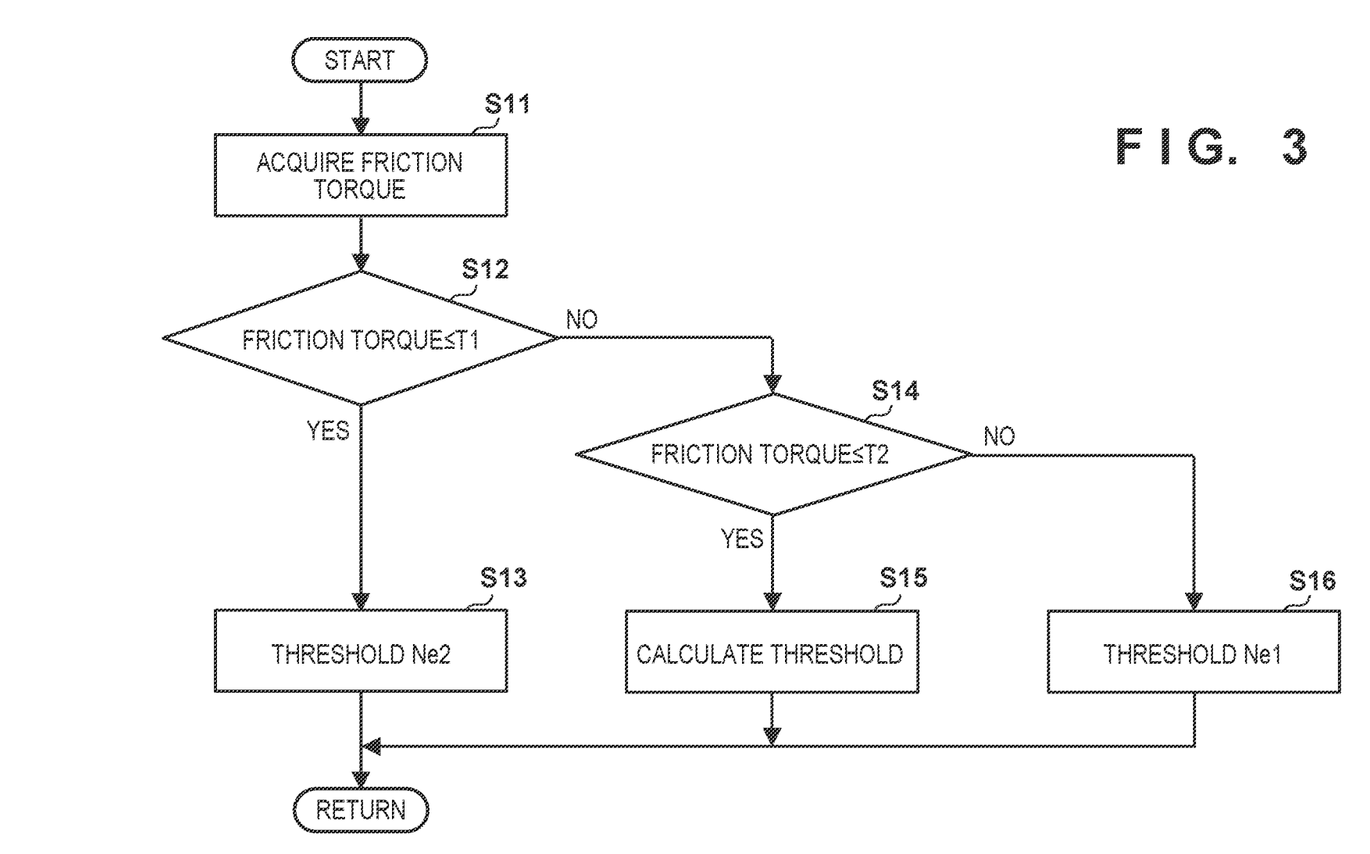
FIG. 3 is a flowchart of processing for setting the threshold for starting monitoring according to the embodiment.

Next, a threshold for starting monitoring according to the embodiment is described with reference to FIG. 2 and FIG. 3. FIG. 2 is a view illustrating an example of a change in the threshold for starting monitoring according to the embodiment and illustrates a change in the threshold for starting monitoring that is related to an increase in the temperature of cooling water of the engine (a decrease in the friction torque). Note that in relation to the progression of time from when the engine is started, it is possible to change the threshold for starting monitoring. FIG. 3 is a flowchart of processing for setting the threshold for starting monitoring according to the embodiment.

In step S11 illustrated in FIG. 3, the friction torque value that is detected by the friction torque calculation unit 13 is acquired by the monitor decision unit 23. The processing advances to step S12, and the warm-up state is determined.

In step S12, it is determined whether the friction torque value is high or the temperature of cooling water of the engine after the engine is started is low (it is determined whether or not the state is the cold state). As an example, it is determined whether the friction torque value is T1 or more as illustrated in FIG. 2. In a case where the friction torque value is T1 or more, the processing advances to step S13, and the threshold is set to Ne2 (approximately constant). Accordingly, because in a case where the friction torque value is high, the engine idle speed is high, in order to prevent misdetection of an abnormal torque, the threshold (engine speed) for starting monitoring is set to the engine idle speed of Ne2 (e.g., 1500 rpm) which is for a case where the water temperature is low.

Meanwhile, in case where the friction torque value is less than T1 in step S12, the processing advances to step S14, and it is determined whether or not the state is the semi warm-up state. As an example, it is determined whether the friction torque value is T2 or more as illustrated in FIG. 2. In a case where the friction torque value is T2 or more, the processing advances to step S15, the threshold is calculated, and the result thereof is set as the threshold. In other words, because when the warm-up progresses and the friction torque decreases (the temperature of cooling water of the engine increases), the engine idle speed decreases, the threshold, from the friction torque value T1 to T2, is calculated to decrease gradually. In FIG. 2, although the threshold that was calculated from the friction torque value T1 to T2 is continuously (or linearly) changing so as to be proportional in relation to the friction torque value (inversely proportional in relation to time and temperature), there are cases where it changes non-linearly.

Meanwhile, in a case where the friction torque value is less than T2 in step S14, it is determined that the state is the warm-up completed state, and the processing advances to step S16. In step S16, the threshold is set to Ne1 (approximately constant). Accordingly, because in a case where the friction torque value is low, the engine idle speed is low, the threshold (engine speed) for starting monitoring is set to the engine idle speed Ne1 (e.g., 1000 rpm) which is for a case where the water temperature is high. Then, the threshold setting processing returns to step S11.

As illustrated in FIG. 2, by the threshold (engine speed) for starting monitoring being set variably, before the engine warm-up is completed, a high engine speed for when cold (of when warming up) may be set as the threshold for starting monitoring, and after the engine warm-up is completed, a low engine speed may be set as the threshold for starting monitoring; therefore, it is possible to, while preventing misdetection of an abnormal torque, appropriately set the timing for starting monitoring in which the torque of the engine is monitored between when the engine is cold and after the warm-up is completed.

Figure 4:
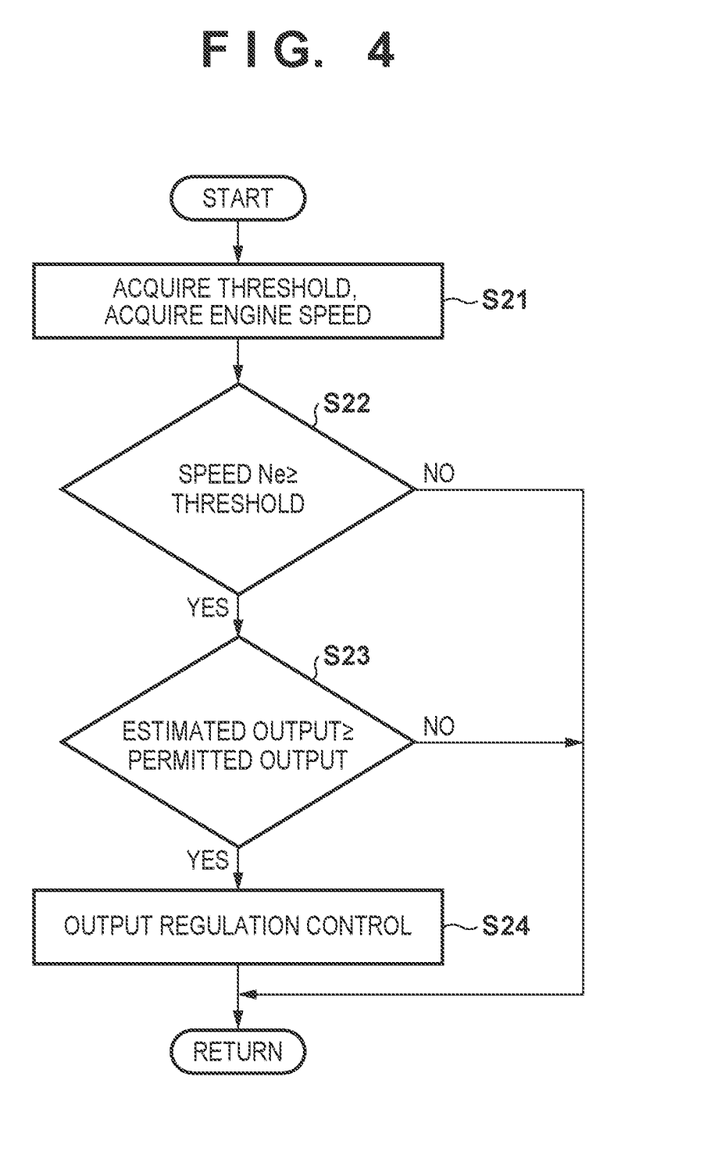
FIG. 4 is a flowchart of output regulation processing according to the embodiment.

Next, a start of monitoring and determination of whether an output is excessive according to the embodiment will be described. FIG. 4 is a flowchart of output regulation processing according to the embodiment.

In step S21, the threshold that was decided by the threshold setting processing illustrated in FIG. 3 and the engine speed that was detected by the engine speed sensor 204 are acquired. The processing advances to step S22, and the threshold and the engine speed are compared. In a case where the engine speed Ne is less than the threshold, the processing returns to step S21.

Meanwhile, in a case where the engine speed Ne is the threshold or more, the processing advances to step S23. In step S23, it is determined that the output is excessive in the abnormal torque detection unit 25. A torque value that was calculated in the estimated shaft torque calculation unit 22 and a torque value that was calculated in the permitted shaft torque calculation unit 21 are compared and it is determined whether the torque value that was calculated in the estimated shaft torque calculation unit 22 is greater than or equal to the torque value that was calculated in the permitted shaft torque calculation unit 21. In a case where it is determined that the torque value that was calculated by the estimated shaft torque calculation unit 22 is less than the torque value that was calculated by the permitted shaft torque calculation unit 21, the processing returns to step S21.

Meanwhile, in a case where it is determined that the torque value that was calculated by the estimated shaft torque calculation unit 22 is greater than or equal to the torque value that was calculated by the permitted shaft torque calculation unit 21, the processing advances to step S24. In step 24, the engine control device 100 adjusts the amount of opening of the throttle valve 302, and an abnormality operation that decreases the output torque of the engine whose torque is abnormal is performed. Then, the threshold setting processing returns to step S21.

Figure 5:
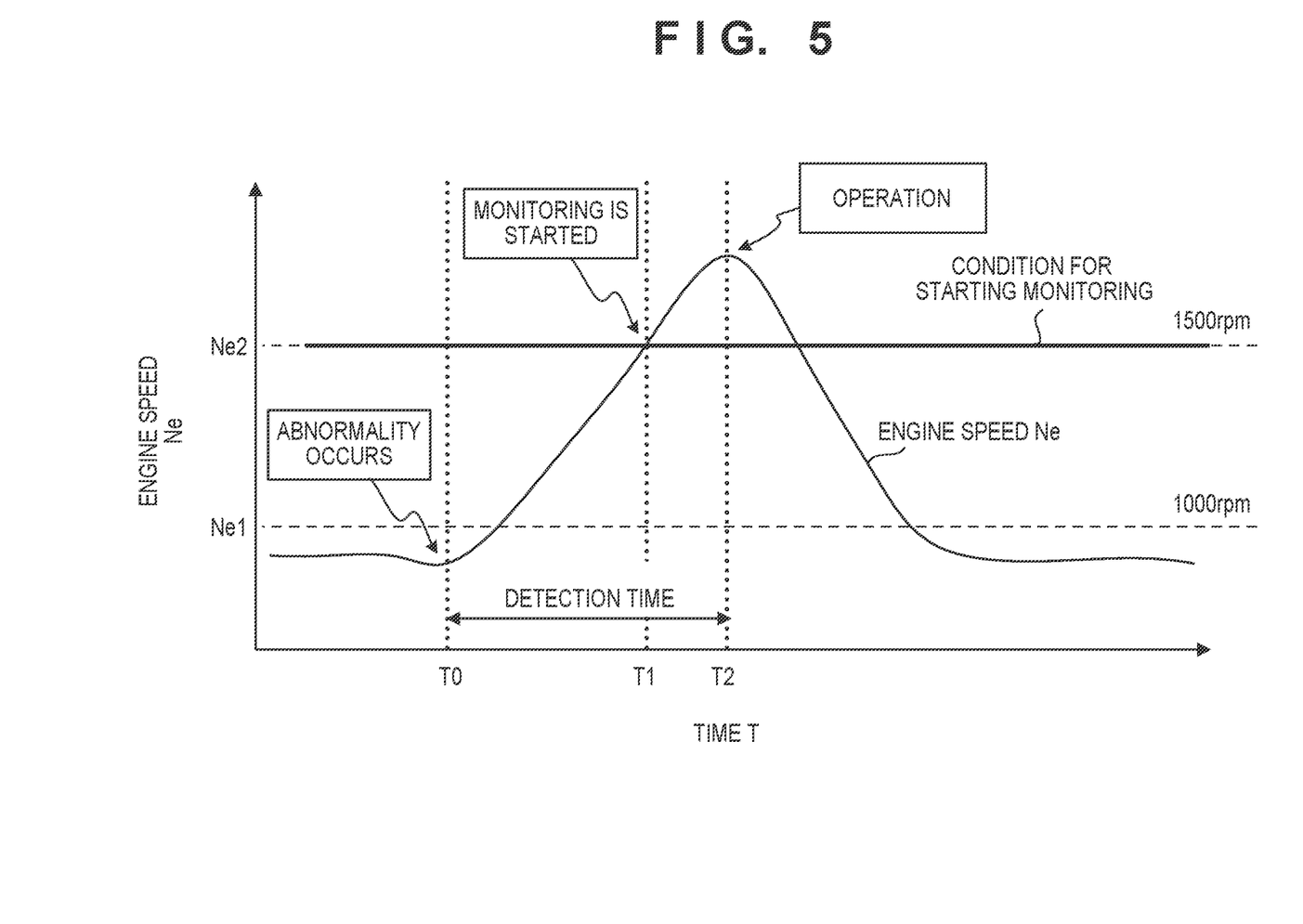
FIG. 5 is a view describing a start of monitoring in a torque monitor unit in a case where the threshold is fixed.

Next, the starting of monitoring in the warm-up completed state will be described with reference to FIG. 5 and FIG. 6. FIG. 5 is a view describing a start of monitoring in a torque monitor unit in a case where the threshold is fixed. The threshold is prevent misdetection of an abnormal torque because in a case where the friction torque value is high, the engine idle speed is high, and the threshold (engine speed) is set to the engine idle speed of Ne2 (e.g., 1500 rpm) which is for a case where the water temperature is low.

Figure 6:
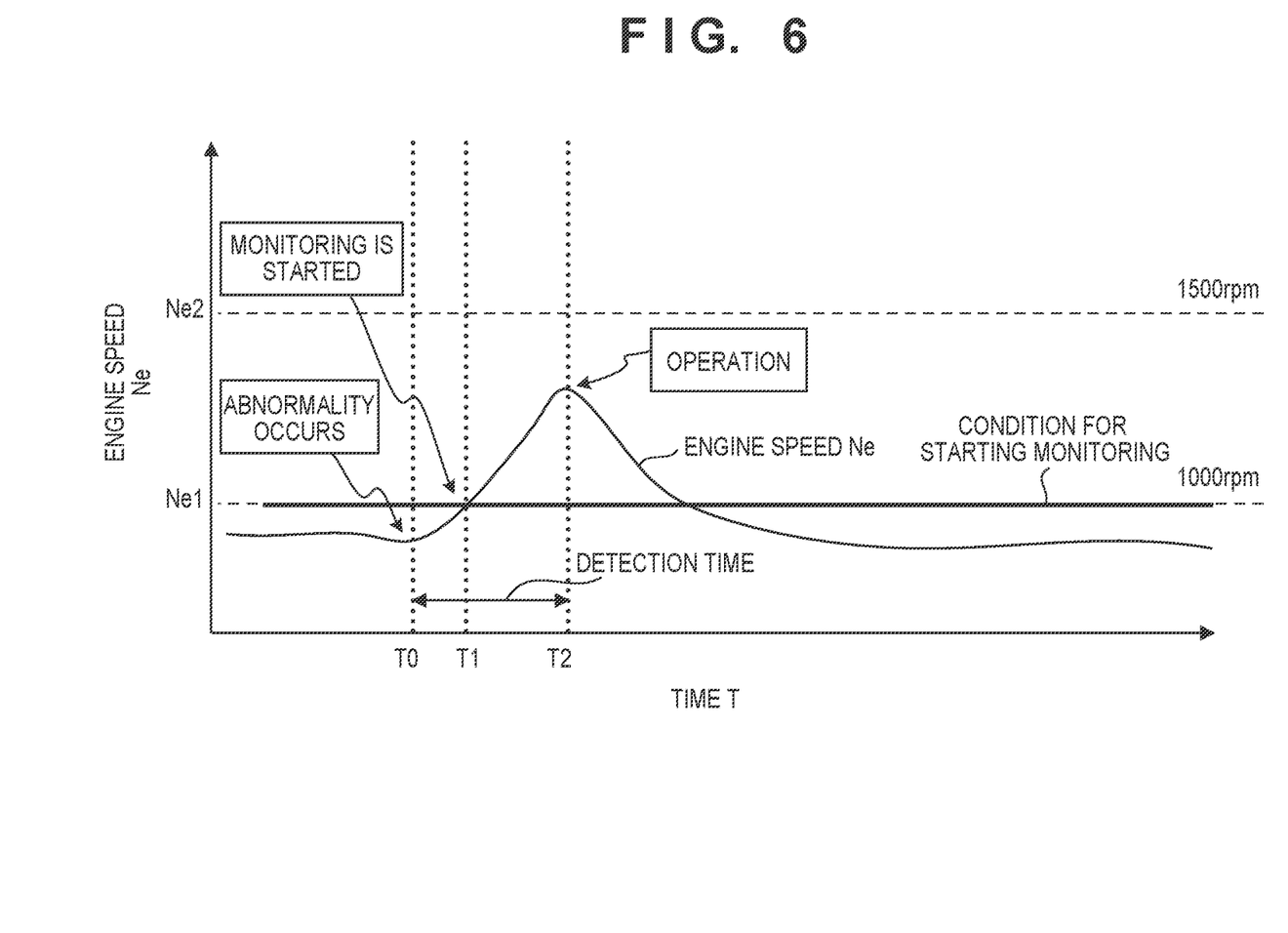
FIG. 6 is a view describing a start of monitoring in a torque monitor unit in a case where the threshold is changed according to the embodiment.

FIG. 6 is a view describing a start of monitoring in the torque monitor unit in a case where the threshold has been changed according to the embodiment. The threshold is a threshold in a case where the state is the warm-up completed state that was decided in the threshold setting processing illustrated in FIG. 3 and is the engine idle speed Ne1 (e.g., 1000 rpm) in a case where the water temperature is high. Curved lines illustrated in FIG. 5 and FIG. 6 are the engine speed Ne in a state of the engine after a warm-up and the idle speed Ne1 is 1000 rpm or less.

At time T0, the engine speed Ne starts to increase and an abnormality in the shaft torque of the engine occurs. However, because the engine speed is less than the threshold, the monitor is not started. Meanwhile, when the engine speed Ne continues to increase and at time T1, reaches the threshold for starting monitoring, determination of whether the output is excessive is started in the abnormal torque detection unit 25.

At time T2, when it is determined that output is excessive, the engine control device 100 adjusts the amount of opening of the throttle valve 302, and an abnormality operation that decreases the output torque of the engine whose torque is abnormal is performed. By that, the engine speed Ne decreases to be the idle speed Ne1 (1000 rpm) or less.

By starting monitoring according to the embodiment as illustrated in FIG. 6, detection time (T2−T0) from when an abnormality in the torque occurs (T0) to when the torque abnormality operation is performed (T1) is reduced in comparison to the detection time (T2−T0) illustrated in FIG. 5, and the total amount of time it takes from when an abnormality occurred to when the engine returns to a stable state may be reduced.

Summary of Embodiment

The above embodiment discloses at least the following engine control device.

1. An engine control device of the above embodiment is:
an engine control device (100) that comprises:
a monitor unit configured to monitor an output of an engine when engine speed is a threshold or more; and
a control unit configured to control the engine based on a result of the monitor unit, wherein
the monitor unit includes:
an output determination unit that determines whether the output of the engine is excessive, and
a change unit that changes in accordance with a warm-up state of the engine, the threshold.

By virtue of this embodiment, it becomes possible to, while preventing misdetection of an abnormal torque, reduce the time it takes to start monitoring the output of the engine, thereby reducing the time it takes from when an abnormality in the engine occurs to an abnormality operation.

2. In the above embodiment,
the warm-up state includes a cold state in an early stage of a start of the engine, a warm-up completed state in which a warm-up of the engine has been completed, and a semi warm-up state between the cold state and the warm-up completed state, wherein
the threshold of the cold state is greater than the threshold of the warm-up completed state.

By virtue of this embodiment, it becomes possible to, while preventing misdetection of an abnormal torque, reduce the time it takes to start monitoring the output of the engine, thereby reducing the time it takes from when an abnormality in the engine occurs to an abnormality operation.

3. In the above embodiment,
the threshold of each of the cold state and the warm-up completed state is approximately constant.

By virtue of this embodiment, it becomes possible to appropriately set a start of monitoring of the engine.

4. In the above embodiment,
the threshold of the semi warm-up state changes continuously.

By virtue of this embodiment, it becomes possible to appropriately set a start of monitoring of the engine.

5. In the above embodiment,
the change unit determines the warm-up state by an estimated value of a friction torque.

By virtue of this embodiment, it becomes possible to appropriately set a start of monitoring of the engine.

6. In the above embodiment,
the control unit, in a case where it is determined that an output is excessive in the output determination unit, controls the engine so as to reduce the output.

By virtue of this embodiment, it becomes possible to reduce the time it takes from when an abnormality in the engine occurs to an abnormality operation.

The invention is not limited to the foregoing embodiments, and various variations/changes are possible within the spirit of the invention.

What is claimed is:

1. An engine control device comprising:
a monitor unit configured to monitor an output of an engine in response to an engine speed reaching a threshold or more; and
a control unit configured to control the engine based on a result of the monitor unit, wherein
the monitor unit includes:
an output determination unit that determines whether the output of the engine is excessive, and
a change unit that changes in accordance with a warm-up state of the engine, the threshold.

2. The engine control device according to claim 1, wherein
the warm-up state includes a cold state in an early stage of a start of the engine, a warm-up completed state in which a warm-up of the engine has been completed, and a semi warm-up state between the cold state and the warm-up completed state, wherein
the threshold of the cold state is greater than the threshold of the warm-up completed state.

3. The engine control device according to claim 2, wherein
the threshold of each of the cold state and the warm-up completed state is constant.

4. The engine control device according to claim 2, wherein
the threshold of the semi warm-up state changes continuously.

5. The engine control device according to claim 1, wherein
the change unit determines the warm-up state by an estimated value of a friction torque.

6. The engine control device according to claim 1, wherein the control unit, in a case where it is determined that an output is excessive in the output determination unit, controls the engine so as to reduce the output.

\* \* \* \* \*